US012600025B2

(12) United States Patent
Doomany et al.

(10) Patent No.: US 12,600,025 B2
(45) Date of Patent: *Apr. 14, 2026

(54) ERGONOMIC MANUAL DRIVER

(71) Applicant: Lowe's Companies, Inc., Mooresville, NC (US)

(72) Inventors: Charles Michael Doomany, Jersey City, NJ (US); Peter Eric Arnell, New York, NY (US); John Eastridge, Brooklyn, NY (US); James Edwin Moore, Las Vegas, NV (US); Richard Yang, Las Vegas, NV (US)

(73) Assignee: Lowe's Companies, Inc., Mooresville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,171

(22) Filed: Nov. 27, 2024

(65) Prior Publication Data

US 2025/0091193 A1 Mar. 20, 2025

Related U.S. Application Data

(63) Continuation of application No. 17/960,032, filed on Oct. 4, 2022, now Pat. No. 12,157,219.

(60) Provisional application No. 63/256,948, filed on Oct. 18, 2021.

(51) Int. Cl.
*B25G 1/10* (2006.01)

(52) U.S. Cl.
CPC .................................... *B25G 1/102* (2013.01)

(58) Field of Classification Search
CPC .......... B25G 1/102; B25B 15/00; B25B 23/12
USPC ........ 173/81, 90, 140–141, 162.1, 197, 198, 173/213, 168–171
See application file for complete search history.

(56) References Cited

U.S. PATENT DOCUMENTS

| | | | | | |
|---|---|---|---|---|---|
| 1,095,671 | A * | 5/1914 | Pitkin | B65D 5/008 | 229/116 |
| 1,395,528 | A * | 11/1921 | Silva | B25B 13/102 | 81/124.5 |
| 1,488,326 | A * | 3/1924 | Dubee | H01T 21/04 | 30/169 |
| 1,582,156 | A * | 4/1926 | Baum | A47J 19/023 | D7/665 |
| 1,711,062 | A * | 4/1929 | Purinton | A22C 17/16 | D8/8 |
| 1,979,460 | A * | 11/1934 | Forsberg | B25B 23/16 | 81/436 |
| 2,377,745 | A * | 6/1945 | Belanger | B25G 1/102 | 407/29.15 |
| 2,851,915 | A * | 9/1958 | Martinez | B25B 23/16 | 279/93 |
| 3,592,247 | A * | 7/1971 | Solf | B25G 1/105 | 81/177.1 |

(Continued)

*Primary Examiner* — Robert F Long
(74) *Attorney, Agent, or Firm* — Kilpatrick Townsend & Stockton LLP

(57) ABSTRACT

An ergonomic manual driver includes a handle having ergonomic recesses. A manual driver includes an elongated shank and a handle. The elongated shank extends along a shank axis. The handle includes a handle body attached to the elongated shank. The handle body includes a proximal portion, a middle portion, and a distal portion. The middle portion includes middle portion pyramid-shaped recesses, distal portion faceted recesses, and/or proximal portion faceted recesses.

15 Claims, 17 Drawing Sheets

(56) References Cited

U.S. PATENT DOCUMENTS

| | | | | |
|---|---|---|---|---|
| 3,993,397 | A * | 11/1976 | Gutshall | H01R 4/40, 411/533 |
| 4,440,048 | A * | 4/1984 | Stevens | B25F 1/04, 81/436 |
| 4,464,796 | A * | 8/1984 | Heissenberger | A61B 42/00, 264/303 |
| 4,480,357 | A * | 11/1984 | Cummins | A44B 1/185, 24/16 PB |
| 4,486,010 | A * | 12/1984 | Haas, Jr. | B25B 5/14, 269/42 |
| 4,739,536 | A * | 4/1988 | Bandera | B25G 1/10, 81/492 |
| 4,791,837 | A * | 12/1988 | Main | B25B 23/16, 81/177.1 |
| 4,969,231 | A * | 11/1990 | Mader | G09F 3/00, 81/177.1 |
| 5,077,897 | A * | 1/1992 | Jubran | B23D 79/08, 30/169 |
| 5,290,063 | A * | 3/1994 | Lenhart | A63C 11/222, 74/551.9 |
| 5,379,542 | A * | 1/1995 | Guzman | B25F 1/02, 30/169 |
| D363,868 | S * | 11/1995 | Israel | D8/83 |
| D373,945 | S * | 9/1996 | Chang | D8/83 |
| 5,556,092 | A * | 9/1996 | Theken | A63B 49/08, 606/1 |
| 5,570,616 | A * | 11/1996 | Thompson | B25B 13/463, 81/63.1 |
| 5,601,003 | A * | 2/1997 | Amtenbrink | B25G 1/105, 81/177.1 |
| 5,662,174 | A * | 9/1997 | Vermilyer | B25B 21/00, 81/177.1 |
| 5,680,776 | A * | 10/1997 | Shenhav | A44C 17/02, 63/26 |
| 5,696,339 | A * | 12/1997 | Brennan | G10D 13/12, 84/422.4 |
| 5,711,193 | A * | 1/1998 | Eggert | B25B 15/04, 81/63.1 |
| 5,722,116 | A * | 3/1998 | Lin | B25G 1/105, 81/177.1 |
| D408,253 | S * | 4/1999 | Rowlay | D8/83 |
| 6,108,870 | A * | 8/2000 | Lo | B25G 1/00, 81/177.1 |
| 6,186,702 | B1 * | 2/2001 | Bartkowski | A01K 61/70, 119/221 |
| 6,189,423 | B1 * | 2/2001 | Kaminski | A01B 1/00, 81/177.1 |
| D445,658 | S * | 7/2001 | Dierolf | D8/83 |
| D452,423 | S * | 12/2001 | Shimansky | D8/83 |
| D452,426 | S * | 12/2001 | Milan | D8/387 |
| D452,427 | S * | 12/2001 | Milan | D8/387 |
| 6,332,233 | B1 * | 12/2001 | Proulx | A46B 5/02, 16/436 |
| 6,681,664 | B1 * | 1/2004 | Hsien | B25G 1/105, 30/340 |
| 6,749,790 | B1 * | 6/2004 | Lieser | B29C 45/1676, 264/254 |
| D543,433 | S * | 5/2007 | Gao | D8/83 |
| D551,052 | S * | 9/2007 | Lin | D8/107 |
| 7,284,300 | B1 * | 10/2007 | Bruns | B25G 1/102, 16/110.1 |
| D562,665 | S * | 2/2008 | Gao | D8/86 |
| 7,566,191 | B2 * | 7/2009 | Hooser | B25G 1/102, 407/29.15 |
| 7,754,138 | B1 * | 7/2010 | Kashiwase | B29C 49/5602, 425/525 |
| RE42,278 | E * | 4/2011 | Kienzler | D8/82 |
| 7,921,567 | B2 * | 4/2011 | Trbovich, Jr. | F41C 27/18, 42/86 |
| 7,975,389 | B2 * | 7/2011 | Bozikis | B26B 21/522, 30/32 |
| D647,201 | S * | 10/2011 | Gauthier | D8/83 |
| 8,261,639 | B2 * | 9/2012 | Liao | B25G 1/01, 81/436 |
| 8,333,134 | B1 * | 12/2012 | Duffy | B25B 13/06, 81/177.1 |
| 8,616,098 | B1 * | 12/2013 | Rosow | B25G 1/102, 81/489 |
| D700,329 | S * | 2/2014 | Lim | D24/152 |
| 8,701,524 | B2 * | 4/2014 | Chang | B25B 13/46, 81/177.1 |
| 9,327,872 | B2 * | 5/2016 | Glaser | B65D 1/0223 |
| 9,546,678 | B2 * | 1/2017 | Wu | F16C 3/026 |
| D791,978 | S * | 7/2017 | Markus | A61M 25/0105, D25/133 |
| 9,949,780 | B2 * | 4/2018 | Nino | A61J 1/05 |
| D818,124 | S * | 5/2018 | Kiefer | D24/152 |
| 10,071,471 | B2 * | 9/2018 | Lawless | B25G 1/10 |
| 10,195,733 | B2 * | 2/2019 | Jannitto, Jr. | B25G 1/005 |
| 10,334,978 | B1 * | 7/2019 | Pogosian | A47J 17/02 |
| 10,334,985 | B2 * | 7/2019 | Gordon | A47L 17/06 |
| D866,766 | S * | 11/2019 | Cahill | A61B 17/8875, D24/171 |
| 10,973,545 | B2 * | 4/2021 | Miller | A61B 17/3474 |
| D921,889 | S * | 6/2021 | Milella, Jr. | D24/133 |
| 11,059,162 | B2 * | 7/2021 | Hyma | B25B 15/02 |
| 2003/0196527 | A1 * | 10/2003 | Strauch | B25B 15/002, 81/436 |
| 2003/0229970 | A1 * | 12/2003 | Chen | B25C 1/04, 16/430 |
| 2004/0035733 | A1 * | 2/2004 | Stanford | B24D 15/10, 206/352 |
| 2004/0079017 | A1 * | 4/2004 | Harris | F41C 27/18, 42/86 |
| 2004/0099106 | A1 * | 5/2004 | Strauch | B25B 23/142, 81/460 |
| 2004/0200079 | A1 * | 10/2004 | Stoughton | B25G 1/102, 30/514 |
| 2006/0171917 | A1 * | 8/2006 | Campbell | A61K 39/00, 424/234.1 |
| 2008/0092337 | A1 * | 4/2008 | Gross | B25G 1/102, 81/489 |
| 2010/0252294 | A1 * | 10/2010 | Kondo | B25F 5/02, 173/217 |
| 2013/0061724 | A1 * | 3/2013 | Lin | B25G 1/102, 81/489 |
| 2014/0115806 | A1 * | 5/2014 | Enders | A47J 37/0786, 15/248.1 |
| 2014/0342853 | A1 * | 11/2014 | Thurman | A63B 71/0045, 473/519 |
| 2016/0129722 | A1 * | 5/2016 | Csokmay | B43K 7/005, 401/6 |
| 2016/0229219 | A1 * | 8/2016 | Pincus | B43K 23/008 |
| 2017/0337885 | A1 * | 11/2017 | Aoki | G02F 1/133606 |
| 2019/0184543 | A1 * | 6/2019 | Hart-Meyer | B25G 1/102 |
| 2020/0015950 | A1 * | 1/2020 | Crotaz | A61C 3/14 |
| 2021/0368739 | A1 * | 12/2021 | Mravca | A01K 29/00 |
| 2025/0262475 | A1 * | 8/2025 | Domesick | A63B 21/0023 |

* cited by examiner

ERGONOMIC MANUAL DRIVER

CROSS-REFERENCES TO RELATED APPLICATIONS

This application claims the benefit of U.S. Non-Provisional patent application Ser. No. 17/960,032, filed Oct. 4, 2022, which claims the benefit to U.S. Provisional Patent Application No. 63/256,948, filed Oct. 18, 2021, the entire contents of which are hereby incorporated by reference for all purposes in its entirety.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The term "manual driver" in this disclosure is not limited to tools that are configured to drive screws. The term instead encompasses screwdrivers as well as any hand tool that is operated manually in substantially the same way as a screwdriver, i.e., by turning a handle about its longitudinal axis to drive something (e.g., a screw, a bolt, a nut, or the like), regardless of whether the working end (or tip) is configured to engage a conventional screw. Examples of "manual drivers," for purposes of this disclosure, include but are not limited to Phillips-head screwdrivers, flat-head screwdrivers, nut drivers with a socketed tip, drivers with removable working ends that can be selected and substituted for one another based on different sizes or configurations of fasteners or anything else that can be driven in a rotational manner by rotating a handle about its longitudinal axis.

In many embodiments, a manual driver includes a tip and a handle having ergonomic recesses. In an illustrated embodiment, a middle portion of the handle includes middle portion recesses. Each of the middle recesses can have an inverted pyramid shape, which can be engaged by a user's thumb. A distal portion of the handle can include faceted recesses that extend somewhat helically around the handle. Likewise, a proximal portion of the handle can include faceted recesses that extend somewhat helically and around the handle. The faceted recesses can be engaged by the user's hand for improved control of the tip of the manual driver.

Thus, in one aspect, a manual driver includes an elongated shank and a handle. The elongated shank includes a tip and extends along a shank axis. The handle is attached to the elongated shank. The handle includes a proximal end, a distal end, a proximal portion, a middle portion, and a distal portion. The middle portion is disposed between the proximal portion and the distal portion. The distal portion is disposed between the distal end and the middle portion. The proximal portion is disposed between the middle portion and the proximal end. The distal portion has a distal portion distal end cross section that is perpendicular to the shank axis and includes polygonal perimeter line segments joined by intervening perimeter segments. The distal portion has a distal portion proximal end cross section that is perpendicular to the shank axis and includes polygonal perimeter line segments joined by intervening perimeter segments. Orientations of the polygonal perimeter line segments of the distal portion distal end are offset rotationally by 15 degrees to 45 degrees around the shank axis relative to the polygonal perimeter line segments of the distal portion proximal end. The distal portion includes distal portion recesses. Each of the distal portion recesses extends from the distal portion proximal end to the distal portion distal end.

In many embodiments, the handle has a tapered profile. For example, in many embodiments, an area of the distal portion distal end cross section is less than an area of the distal portion proximal end cross section.

In many embodiments, each of the distal portion recesses are faceted. For example, each of the distal portion recesses can be predominantly defined by a respective distal portion recess first facet and a respective distal portion recess second facet. Each of the handle respective distal portion recess first facets can have a perimeter that includes a respective one of the polygonal perimeter line segments of the distal portion distal end cross section and an end point of a respective one of the polygonal perimeter line segments of the distal portion proximal end cross section. Each of the respective distal portion recess second facets can have a perimeter that includes a respective one of the polygonal perimeter line segments of the distal portion proximal end cross section and an end point of a respective one of the polygonal perimeter line segments of the distal portion distal end cross section. Each of the respective distal portion recess first facets can be planar. Each of the respective distal portion recess second facets can be planar.

In many embodiments, the distal portion recesses are configured to enhance the ability of a user to apply combined compression and torsion to a fastener or other object to be driven via the tip. For example, in some embodiments, each of the respective distal portion recess first facets is oriented so that a compressive force applied perpendicular to the respective distal portion recess first facet induces a combination of axial compression and torsion in the elongated shank for transfer to a fastener or other object to be driven via the tip.

The distal portion can include any suitable number of the distal portion recesses. For example, the proximal portion can include 3, 4, 5, 6, 7, 8, or more of the distal portion recesses. In an illustrated embodiment, the distal portion includes six of the distal portion recesses.

In some embodiments, the distal portion distal end is offset rotationally relative to the distal portion proximal end by an angle within a more restricted range of angles. For example, in some embodiments, orientations of the polygonal perimeter line segments of the distal portion distal end are offset rotationally by 25 degrees to 35 degrees around the shank axis relative to the polygonal perimeter line segments of the distal portion proximal end. In an illustrated embodiment, orientations of the polygonal perimeter line segments of the distal portion distal end are offset rotationally by 30 degrees around the shank axis relative to the polygonal perimeter line segments of the distal portion proximal end.

The middle portion can include any suitable number of suitably shaped middle portion recesses. For example, the middle portion can include 3, 4, 5, 6, 7, 8, or more middle portion recesses. In an illustrated embodiment, the middle portion includes six pyramid-shaped recesses.

The distal portion recesses can extend over any suitable length of the handle. For example, the handle can have a handle length between the handle proximal end and the handle distal end. In some embodiments, each of the distal portion recesses extends between 37 to 47 percent of the handle length.

The middle portion recesses can extend over any suitable length of the handle. For example, the handle can have a handle length between the handle proximal end and the handle distal end. In some embodiments, each of the middle portion recesses extends between 17 to 27 percent of the handle length.

In some embodiments, the proximal portion is configured similar to the distal portion. For example, in some embodiments, the proximal portion has a proximal portion distal end cross section that is perpendicular to the shank axis and comprises polygonal perimeter line segments joined by intervening perimeter segments. The proximal portion can have a proximal portion proximal end cross section that is perpendicular to the shank axis and comprises polygonal perimeter line segments joined by intervening perimeter segments. Orientations of the polygonal perimeter line segments of the proximal portion distal end can be offset rotationally by 15 degrees to 45 degrees around the shank axis relative to the polygonal perimeter line segments of the proximal portion proximal end. The proximal portion can include proximal portion recesses. Each of the proximal portion recesses can extend from the proximal portion proximal end to the proximal portion distal end.

In many embodiments, the proximal portion has a tapered profile. For example, in many embodiments, an area of the proximal portion distal end cross section can be greater than an area of the proximal portion proximal end cross section.

In many embodiments, each of the proximal portion recesses are faceted. For example, each of the proximal portion recesses can be predominantly defined by a respective proximal portion recess first facet and a respective proximal portion recess second facet. Each of the respective proximal portion recess first facets can have a perimeter that comprises a respective one of the polygonal perimeter line segments of the proximal portion distal end cross section and an end point of a respective one of the polygonal perimeter line segments of the proximal portion proximal end cross section. Each of the respective proximal portion recess second facets can have a perimeter that comprises a respective one of the polygonal perimeter line segments of the proximal portion proximal end cross section and an end point of a respective one of the polygonal perimeter line segments of the proximal portion distal end cross section. In some embodiments, each of the respective proximal portion recess first facets is planar. In some embodiments, each of the respective proximal portion recess second facets is planar.

In many embodiments, the proximal portion recesses are configured to enhance the ability of a user to apply combined compression and torsion to a fastener or other object to be driven via the tip. For example, in some embodiments, each of the respective proximal portion recess first facets is oriented so that a compressive force applied perpendicular to the respective proximal portion recess first facet induces a combination of axial compression and torsion in the elongated shank for transfer to a fastener or other object to be driven via the tip.

The proximal portion can include any suitable number of suitably shaped proximal portion recesses. For example, the proximal portion can include 3, 4, 5, 6, 7, 8, or more proximal portion recesses. In an illustrated embodiment, the proximal portion includes six of the proximal portion recesses.

In some embodiments, the proximal portion distal end is offset rotationally relative to the proximal portion proximal end by an angle within a more restricted range of angles. For example, in some embodiments, orientations of the polygonal perimeter line segments of the proximal portion distal end are offset rotationally by 25 degrees to 35 degrees around the shank axis relative to the polygonal perimeter line segments of the proximal portion proximal end. In an illustrated embodiment, orientations of the polygonal perimeter line segments of the proximal portion distal end are offset rotationally by 30 degrees around the shank axis relative to the polygonal perimeter line segments of the proximal portion proximal end.

The proximal portion recesses can extend over any suitable length of the handle. For example, the handle can have a handle length between the handle proximal end and the handle distal end. In some embodiments, each of the proximal portion recesses extends between 19 to 29 percent of the handle length.

In some embodiments, the handle of the manual driver comprises a core made of a first material, and at least one layer of additional material surrounding the core. The one or more layers in the at least one layer can be made of the same material as the first material or a different material. One of the layers in the at least one layer of additional material forms an information ring that is visible on an outer surface of the handle and that bears indicia indicative of a configuration of the tip.

In another aspect, a manual driver includes an elongated shank and a handle. The elongated shank includes a tip and extends along a shank axis. The handle is attached to the elongated shank. The handle includes a proximal end, a distal end, a proximal portion, a middle portion, and a distal portion. The middle portion is disposed between the proximal portion and the distal portion. The distal portion is disposed between the distal end and the middle portion. The proximal portion is disposed between the middle portion and the proximal end. The proximal portion has a proximal portion distal end cross section that is perpendicular to the shank axis and includes polygonal perimeter line segments joined by intervening perimeter segments. The proximal portion has a proximal portion proximal end cross section that is perpendicular to the shank axis and includes polygonal perimeter line segments joined by intervening perimeter segments. Orientations of the polygonal perimeter line segments of the proximal portion distal end are offset rotationally by 15 degrees to 45 degrees around the shank axis relative to the polygonal perimeter line segments of the proximal portion proximal end. The proximal portion includes proximal portion recesses. Each of the proximal portion recesses extends from the proximal portion proximal end to the proximal portion distal end.

In many embodiments, the handle has a tapered profile. For example, in many embodiments, an area of the proximal portion distal end cross section is greater than an area of the proximal portion proximal end cross section.

In many embodiments, each of the proximal portion recesses are faceted. For example, each of the proximal portion recesses can be predominantly defined by a respective proximal portion recess first facet and a respective proximal portion recess second facet. Each of the handle respective proximal portion recess first facets can have a perimeter that includes a respective one of the polygonal perimeter line segments of the proximal portion distal end cross section and an end point of a respective one of the polygonal perimeter line segments of the proximal portion proximal end cross section. Each of the respective proximal portion recess second facets can have a perimeter that includes a respective one of the polygonal perimeter line segments of the proximal portion proximal end cross section and an end point of a respective one of the polygonal perimeter line segments of the proximal portion distal end cross section. Each of the respective proximal portion recess first facets can be planar. Each of the respective proximal portion recess second facets can be planar.

In many embodiments, the proximal portion recesses are configured to enhance the ability of a user to apply combined compression and torsion to a fastener or other object to be driven via the tip. For example, in some embodiments, each of the respective proximal portion recess first facets is oriented so that a compressive force applied perpendicular to the respective proximal portion recess first facet induces a combination of axial compression and torsion in the elongated shank for transfer to a fastener or other object to be driven via the tip.

The proximal portion can include any suitable number of the proximal portion recesses. For example, the proximal portion can include 3, 4, 5, 6, 7, 8, or more of the proximal portion recesses. In an illustrated embodiment, the proximal portion includes six of the proximal portion recesses.

In some embodiments, the proximal portion distal end is offset rotationally relative to the proximal portion proximal end by an angle within a more restricted range of angles. For example, in some embodiments, orientations of the polygonal perimeter line segments of the proximal portion distal end are offset rotationally by 25 degrees to 35 degrees around the shank axis relative to the polygonal perimeter line segments of the proximal portion proximal end. In an illustrated embodiment, orientations of the polygonal perimeter line segments of the proximal portion distal end are offset rotationally by 30 degrees around the shank axis relative to the polygonal perimeter line segments of the proximal portion proximal end.

The middle portion can include any suitable number of suitably shaped middle portion recesses. For example, the middle portion can include 3, 4, 5, 6, 7, 8, or more middle portion recesses. In an illustrated embodiment, the middle portion includes six pyramid-shaped recesses.

The proximal portion recesses can extend over any suitable length of the handle. For example, the handle can have a handle length between the handle proximal end and the handle distal end. In some embodiments, each of the proximal portion recesses extends between 19 to 29 percent of the handle length.

The middle portion recesses can extend over any suitable length of the handle. For example, the handle can have a handle length between the handle proximal end and the handle distal end. In some embodiments, each of the middle portion recesses extends between 17 to 27 percent of the handle length.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which:

FIGS. 8-11 show a manual driver embodiment with a multi-layered example of the ergonomic handle, wherein FIGS. 8 and 10 are cross-sections of the manual driver and FIGS. 9 and 11 respectively are perspective and side views of the manual driver.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
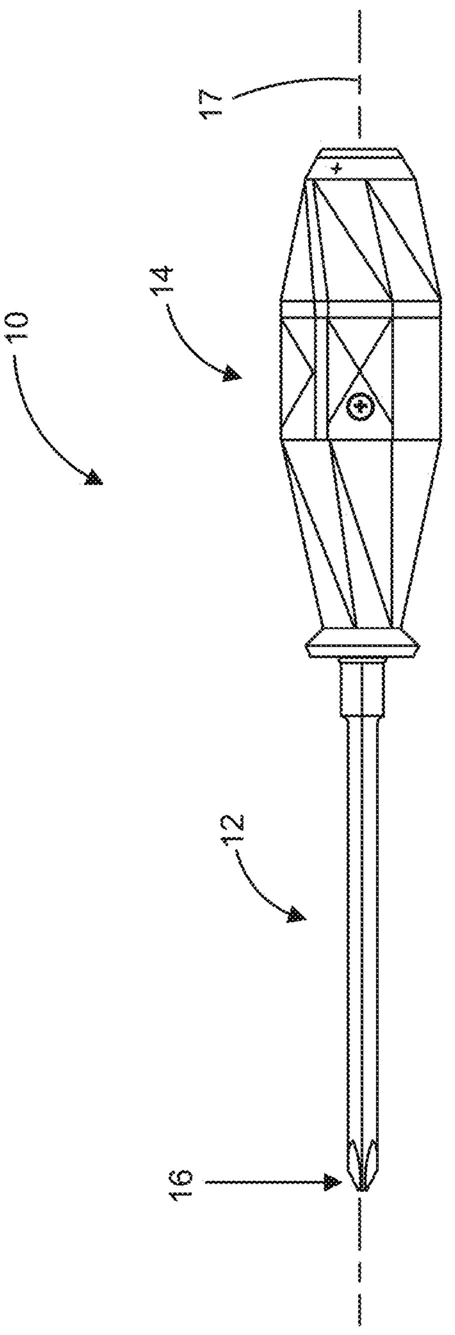
FIG. 1 is a side view of a manual driver that includes an ergonomic handle, in accordance with embodiments.

Turning now to the drawing figures in which similar reference identifiers refer to similar elements, FIG. 1 is a side view of a manual driver 10, in accordance with embodiments. The manual driver 10 includes an elongated shank 12 and an ergonomic handle 14. The elongated shank 12 includes a suitable tip 16 and is aligned with a shaft axis 17. In the illustrated embodiment, the tip 16 is a magnetic Phillips tip and the elongated shank 12 has a hexagonal cross-sectional shape.

Figure 2:
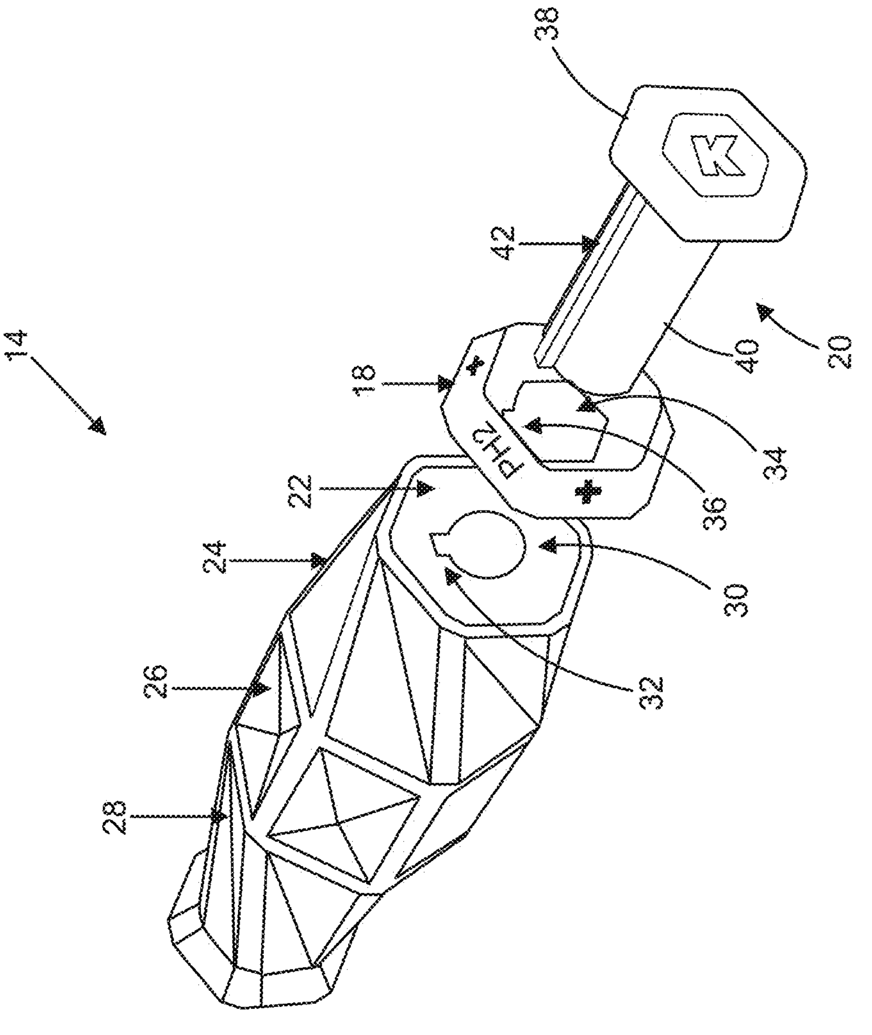
FIG. 2 is an isometric exploded view of the ergonomic handle of the manual driver of FIG. 1.
Figure 3:
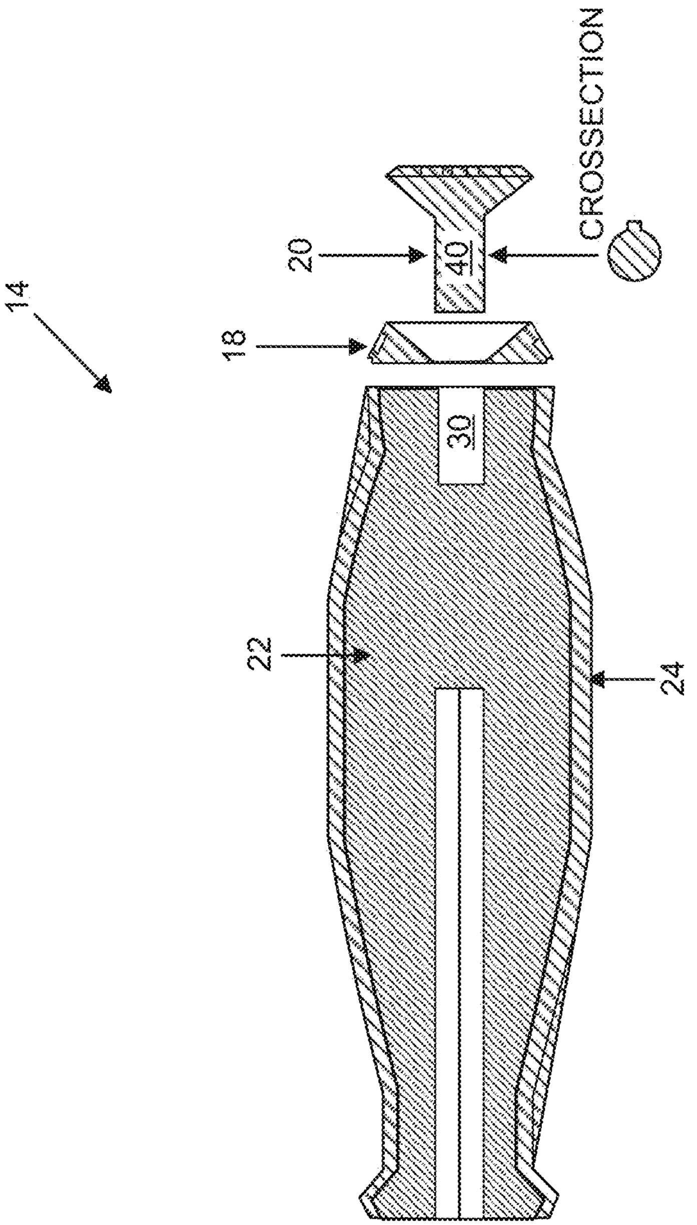
FIG. 3 is a cross-sectional view of the ergonomic handle of the manual driver of FIG. 1.

FIG. 2 is an isometric exploded view of the ergonomic handle 14. The handle 14 includes a handle body 14, an Acrylonitrile Butadiene Styrene (ABS) information ring 18, and a polypropylene end cap 20. The handle body 14 includes a polypropylene core 22, a thermoplastic elastomer (TPE) over-molded layer 24, a molded ICON insert 26, and a molded company or brand LOGO insert 28. The polypropylene core 22 includes an aperture 30 having a keyway 32. The ABS information ring 18 includes an aperture 34 and a keyway 36. The polypropylene end cap 20 includes a flanged portion 38 and an elongated shaft 40 having an elongated key 42. The apertures 30, 34 and the keyways 32, 36 are sized and shaped to accommodate the shaft 40 so that the end cap 20 secures the ABS information ring 18 to the handle body 14. The ABS information ring 18 can include markings designating specifications of the manual driver 10. For example, in the illustrated embodiment, the ABS information ring 18 includes the marking "PH2", which designates a size 2 Phillips screwdriver, and a "+" icon which denotes a cross-sectional shape of the tip 16 (e.g., of a Phillips screwdriver). FIG. 3 shows a longitudinal cross-sectional view of the ergonomic handle 14, including its TPE over-molded layer 24, polypropylene core 22, aperture 30, information ring 18, and end cap 20 (with its elongated shaft 40).

Figure 4:
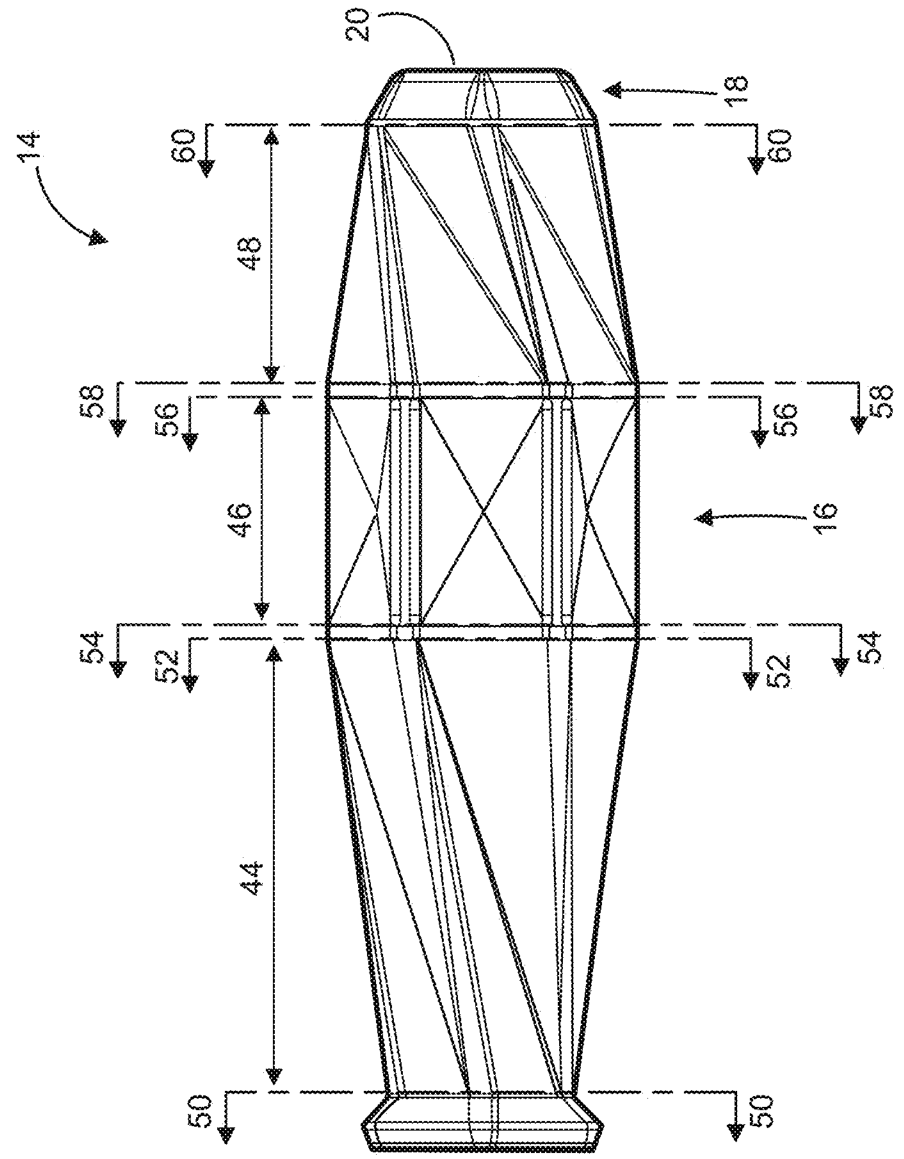
FIG. 4 is a side view of the ergonomic handle of the manual driver of FIG. 1.
Figure 5A:
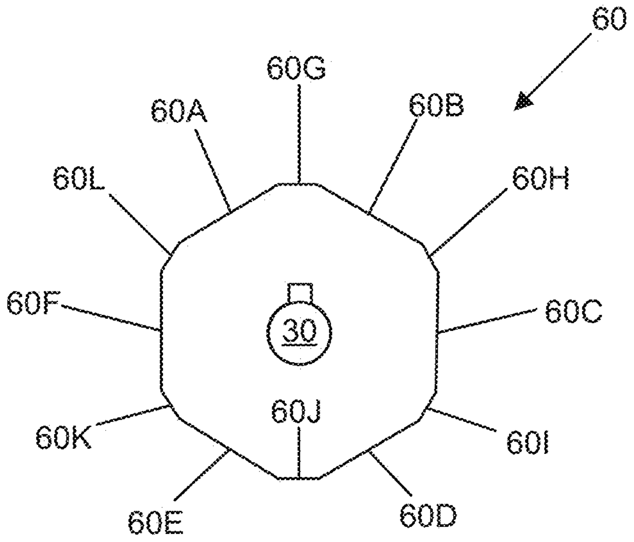
FIG. 5A, FIG. 5B, FIG. 5C, FIG. 5D, FIG. 5E, and FIG. 5F show cross-sectional views of the ergonomic handle of the manual driver of FIG. 1.
Figure 5B:
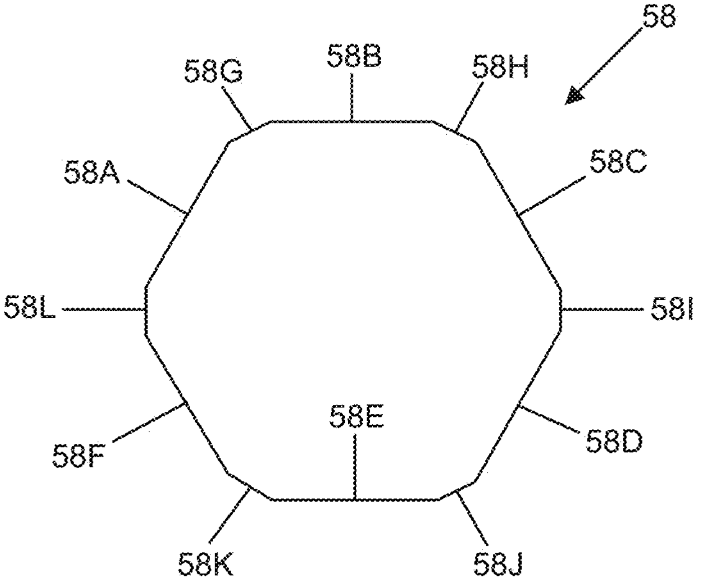
Figure 5C:
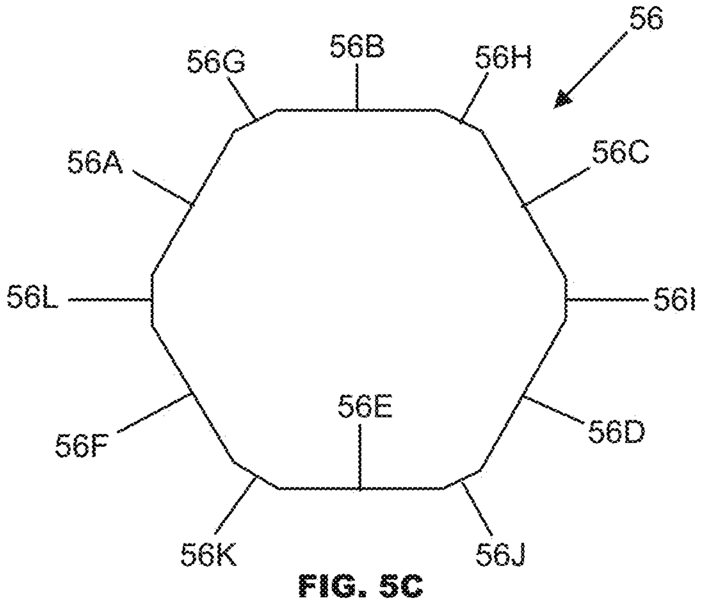
Figure 5D:
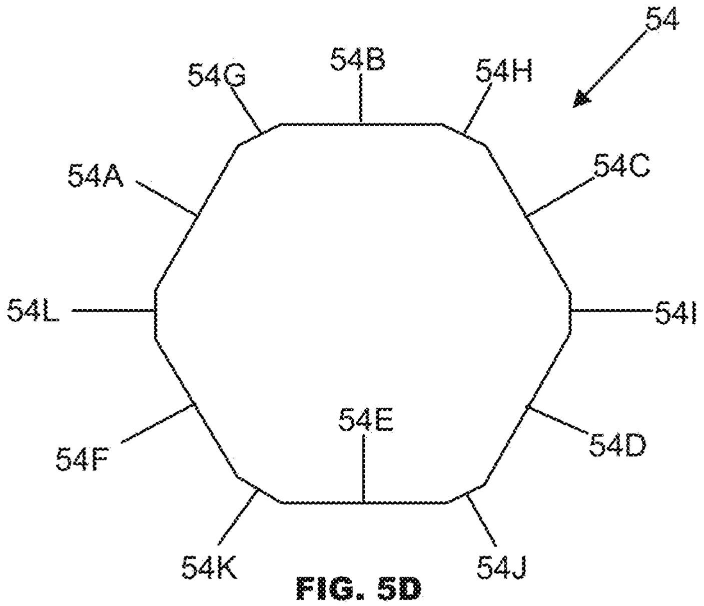
Figure 5E:
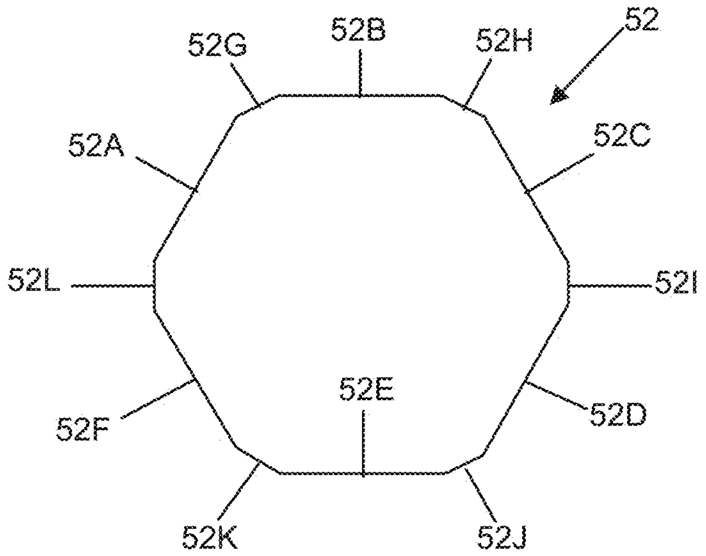
Figure 5F:
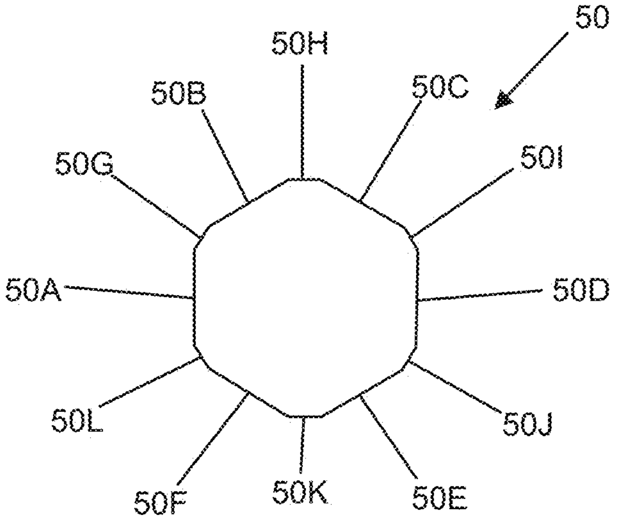
Figure 6A:
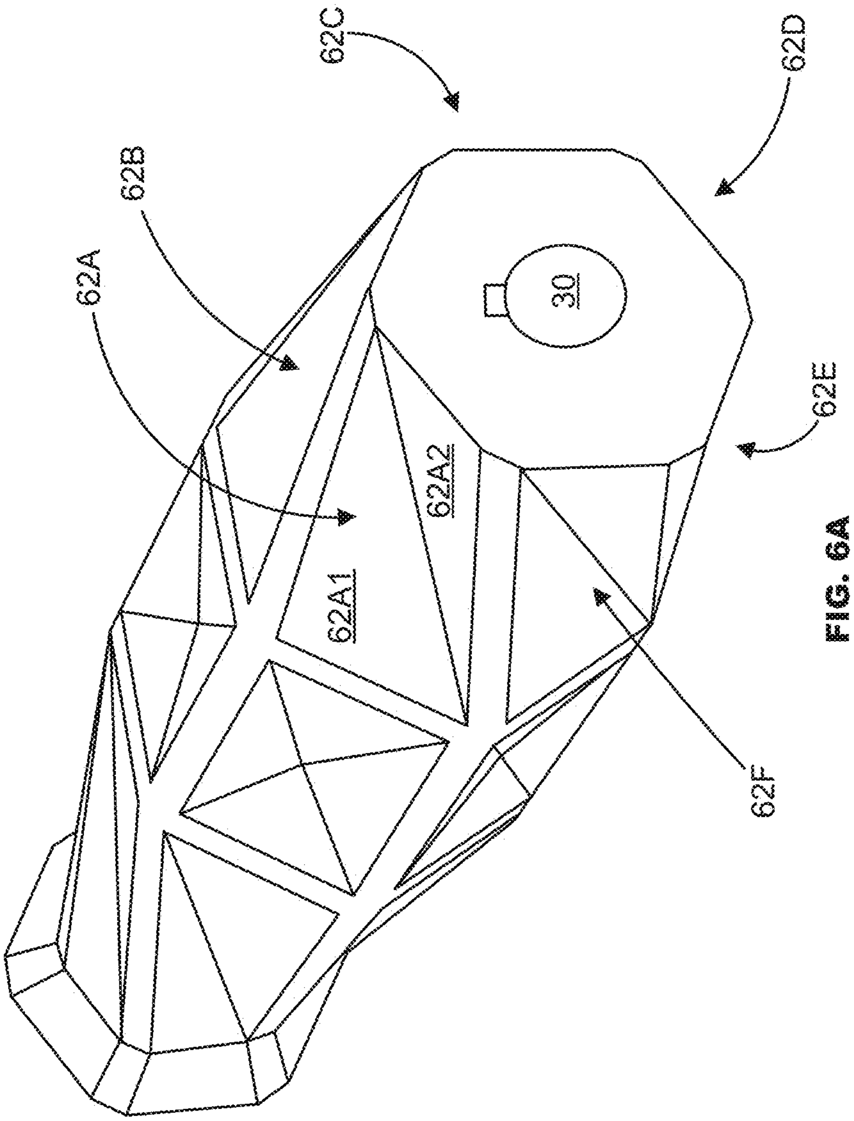
FIG. 6A, FIG. 6B, and FIG. 6C show isometric views of the ergonomic handle of the manual driver of FIG. 1.
Figure 6B:
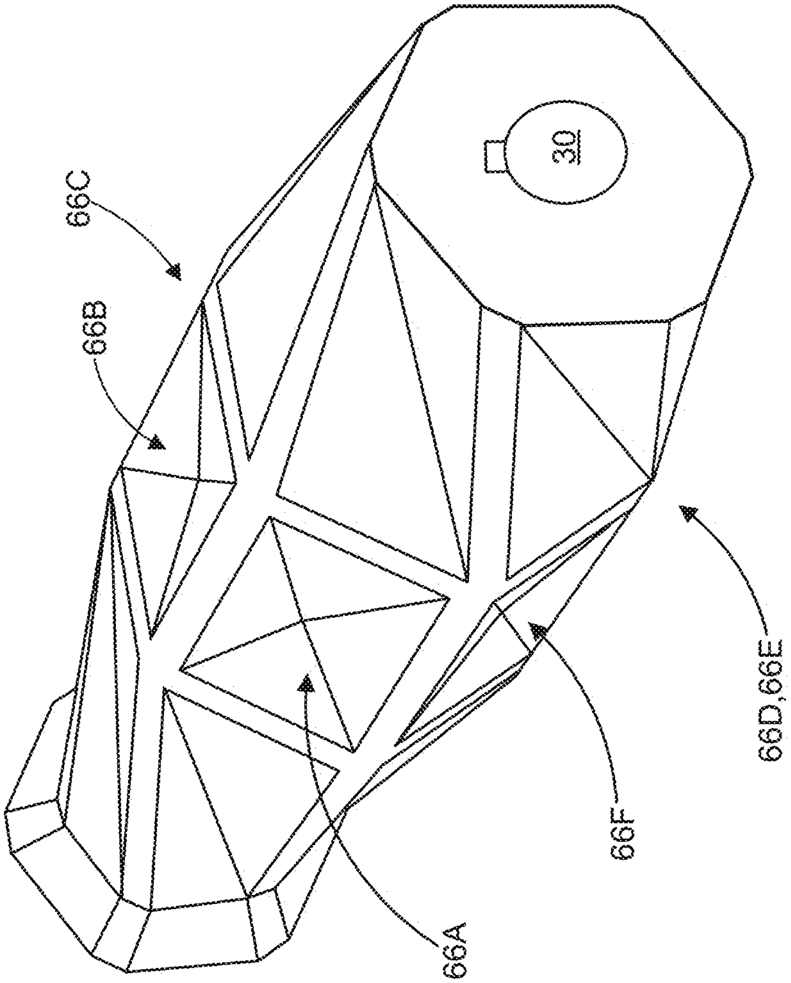
Figure 6C:
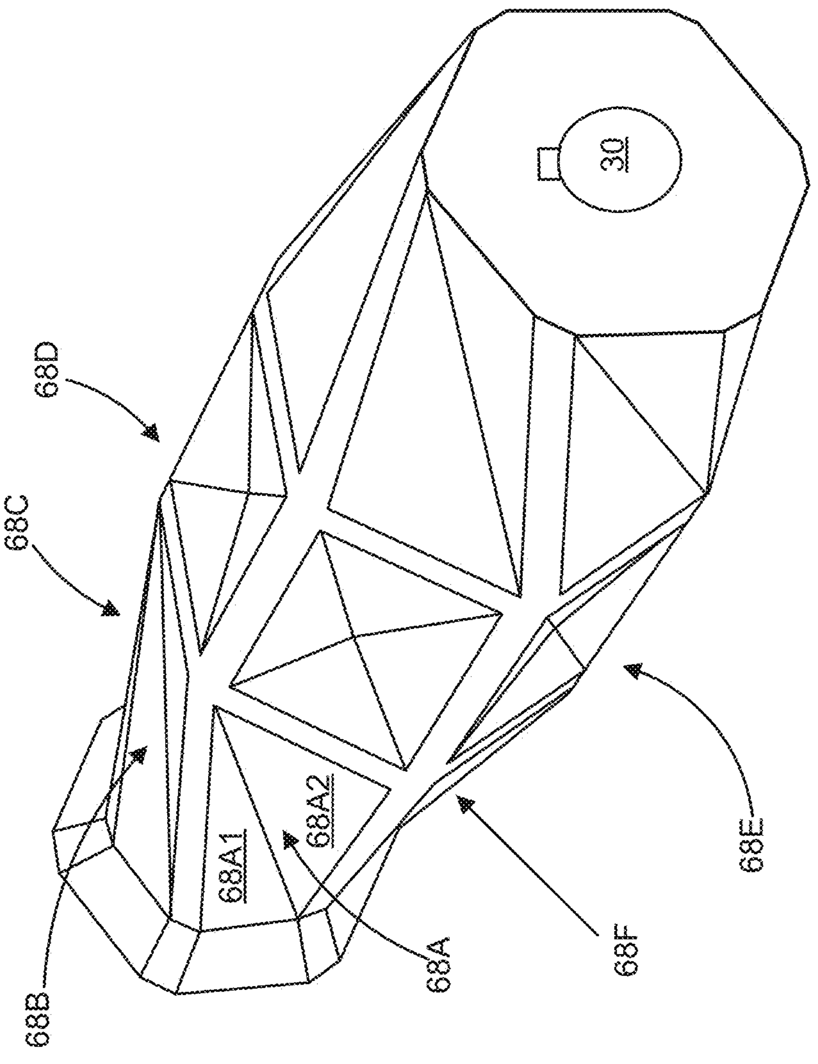

FIG. 4, FIG. 5A, FIG. 5B, FIG. 5C, FIG. 5D, FIG. 5E, FIG. 5F, FIG. 6A, FIG. 6B, and FIG. 6C illustrate the exterior surface shape of the ergonomic handle 14. FIG. 4 is a side view of the ergonomic handle 14. FIG. 5A, FIG. 5B, FIG. 5C, FIG. 5D, FIG. 5E, and FIG. 5F show cross-sectional views of the ergonomic handle. FIG. 6A, FIG. 6B, and FIG. 6C show an isometric view of the handle body 14.

The handle body 14 includes a distal portion 44, a middle portion 46, and a proximal portion 48. The distal portion 44 extends from a distal portion distal end 50 to a distal portion proximal end 52. The middle portion 46 extends from a middle portion distal end 54 to a middle portion proximal end 56. The proximal portion 48 extends from a proximal portion distal end 58 to a proximal portion proximal end 60. In the illustrated embodiment, each of the distal portion distal end 50, the distal portion proximal end 52, the middle portion distal end 54, the middle portion proximal end 56, the proximal portion distal end 58, and the proximal portion proximal end 60 has a substantially hexagonal shape defined by hexagonal perimeter line segments joined by intervening perimeter segments.

FIG. 5A shows a cross-sectional view of the handle body 14 through the proximal portion proximal end 60. The proximal portion proximal end 60 has a substantially hexagonal shape defined by hexagonal perimeter line segments 60A, 60B, 60C, 60D, 60E, 60F and intervening perimeter segments 60G, 60H, 60I, 60J, 60K, 60L.

FIG. 5B shows a cross-sectional view of the handle body 14 through the proximal portion distal end 58. The proximal portion distal end 58 has a substantially hexagonal shape defined by hexagonal perimeter line segments 58A, 58B, 58C, 58D, 58E, 58F and intervening perimeter segments 58G, 58H, 58I, 58J, 58K, 58L. The proximal portion distal end 58 has a greater cross-sectional area than the proximal portion proximal end 60. In the illustrated embodiment, the orientation of the substantially hexagonal shape of the proximal portion distal end 58 is offset rotationally counter-clockwise around the shank axis 17 by 30 degrees relative to the orientation of the substantially hexagonal shape of the proximal portion proximal end 60 for a distally-oriented view direction aligned with the shank axis 17.

FIG. 5C shows a cross-sectional view of the handle body 14 through the middle portion proximal end 56. The middle portion proximal end 56 has a substantially hexagonal shape defined by hexagonal perimeter line segments 56A, 56B, 56C, 56D, 56E, 56F and intervening perimeter segments 56G, 56H, 56I, 56J, 56K, 56L. In the illustrated embodiment, the middle portion proximal end 56 and the proximal portion distal end 58 have the same or approximately the same cross-sectional area. In the illustrated embodiment, the orientation of the substantially hexagonal shape of the middle portion proximal end 56 around the shank axis 17 is the same as the substantially hexagonal shape of the proximal portion distal end 58.

FIG. 5D shows a cross-sectional view of the handle body 14 through the middle portion distal end 54. The middle portion distal end 54 has a substantially hexagonal shape defined by hexagonal perimeter line segments 54A, 54B, 54C, 54D, 54E, 54F and intervening perimeter segments 54G, 54H, 54I, 54J, 54K, 54L. In the illustrated embodiment, the middle portion distal end 54 and the middle portion proximal end 56 have the same or approximately the same cross-sectional area. In the illustrated embodiment, the orientation of the substantially hexagonal shape of the middle portion distal end 54 around the shank axis 17 is the same as the substantially hexagonal shape of the middle portion proximal end 56.

FIG. 5E shows a cross-sectional view of the handle body 14 through the distal portion proximal end 52. The distal portion proximal end 52 has a substantially hexagonal shape defined by hexagonal perimeter line segments 52A, 52B, 52C, 52D, 52E, 52F and intervening perimeter segments 52G, 52H, 52I, 52J, 52K, 52L. In the illustrated embodiment, the distal portion proximal end 52 and the middle portion distal end 54 have the same or approximately the same cross-sectional area. In the illustrated embodiment, the orientation of the substantially hexagonal shape of the distal portion proximal end 52 around the shank axis 17 is the same as the substantially hexagonal shape of the middle portion distal end 54.

FIG. 5F shows a cross-sectional view of the handle body 14 through the distal portion distal end 50. The distal portion distal end 50 has a substantially hexagonal shape defined by hexagonal perimeter line segments 50A, 50B, 50C, 50D, 50E, 50F and intervening perimeter segments 50G, 50H, 50I, 50J, 50K, 50L. The distal portion distal end 50 has a smaller cross-sectional area than the proximal portion proximal end 60. In the illustrated embodiment, the orientation of the substantially hexagonal shape of the distal portion distal end 50 is offset rotationally counter-clockwise around the shank axis 17 by 30 degrees relative to the orientation of the substantially hexagonal shape of the distal portion proximal end 52 for a distally-oriented view direction aligned with the shank axis 17.

Referring now to FIG. 6A, the proximal portion 48 of the handle body 14 has six proximal portion recesses 62A, 62B, 62C, 62D, 62E, 62F. Each of the six proximal portion recesses 62A, 62B, 62C, 62D, 62E, 62F is defined by a respective pair of planar triangular facets. For example, the proximal portion recess 62A is defined by a pair of planar triangular facets 62A1, 62A2. Planar facet 62A1 includes and extends from the perimeter line segment 58A (disposed at the proximal portion distal end 58) to the intersection of the perimeter line segment 60A and the intervening perimeter segment 60G (both of which are disposed at the proximal portion proximal end 60). Planar facet 62A2 includes and extends from the perimeter line segment 60A (disposed at the proximal portion proximal end 60) to the intersection of the perimeter line segment 58A and the intervening perimeter segment 58L (both of which are disposed at the proximal portion distal end 58). Each of the proximal portion recesses 62B, 62C, 62D, 62E, 62F is defined similar to the above-described example of proximal portion recess 62A.

Referring now to FIG. 6B, the middle portion 46 of the handle body 14 has six middle portion recesses 66A, 66B, 66C, 66D, 66E, 66F. Each of the six middle portion recesses 66A, 66B, 66C, 66D, 66E, 66F has an inverted pyramid shape with a rectangular, open base and an apex pointing in a radially inward direction toward the shaft axis 17. For example, the middle portion recess 66A has a rectangular base that extends from perimeter line segment 56A (which is disposed at the middle portion proximal end 56) to perimeter line segment 54A (which is disposed at the middle portion distal end 54). The middle portion recess 66B has a rectangular base that extends from perimeter line segment 56B to perimeter line segment 54B. The middle portion recess 66C has a rectangular base that extends from perimeter line segment 56C to perimeter line segment 54C. The middle portion recess 66D has a rectangular base that extends from perimeter line segment 56D to perimeter line segment 54D. The middle portion recess 66E has a rectangular base that extends from perimeter line segment 56E to perimeter line segment 54E. The middle portion recess 66F has a rectangular base that extends from perimeter line segment 56F to perimeter line segment 54F.

Referring now to FIG. 6C, the distal portion 44 of the handle body 14 has six distal portion recesses 68A, 68B, 68C, 68D, 68E, 68F. Each of the six distal portion recesses 68A, 68B, 68C, 68D, 68E, 68F is defined by a respective pair of planar triangular facets. For example, the proximal portion recess 68A is defined by a pair of planar triangular facets 68A1, 68A2. Planar facet 68A1 includes and extends from the perimeter line segment 50A (disposed at the distal portion distal end 50) to the intersection of the perimeter line segment 52A and the intervening perimeter segment 52G (both of which are disposed at the distal portion proximal end 52). Planar facet 68A2 includes and extends from the perimeter line segment 52A (disposed at the distal portion proximal end 52) to the intersection of the perimeter line segment 50A and the intervening perimeter segment 50L (both of which are disposed at the distal portion distal end 50). Each of the distal portion recesses 68B, 68C, 68D, 68E, 68F is defined similar to the above-described example of proximal portion recess 68A.

Figure 7A:
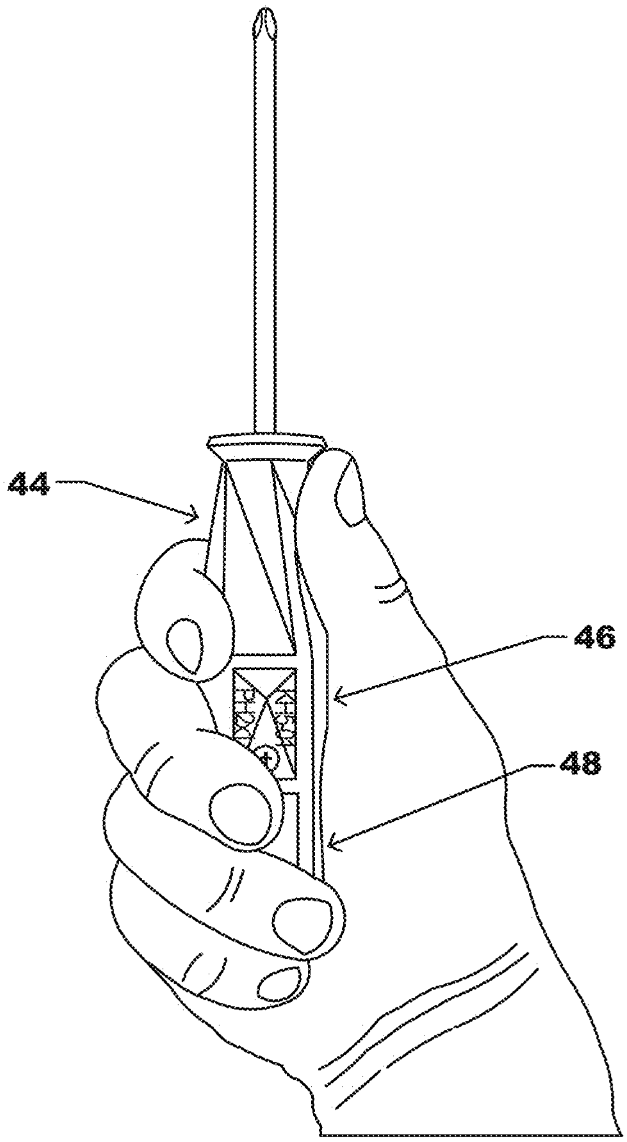
FIG. 7A, FIG. 7B, and FIG. 7C show three examples of different manual driver grips that can be accommodated comfortably by the ergonomic handle of the manual driver in FIG. 1.
Figure 7B:
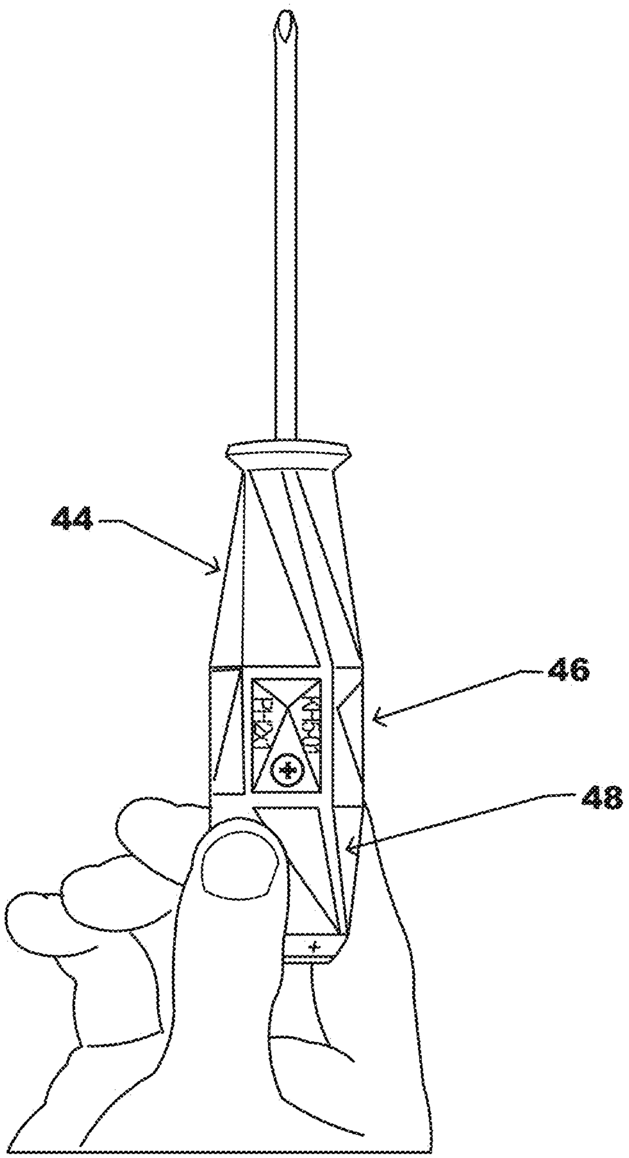
Figure 7C:
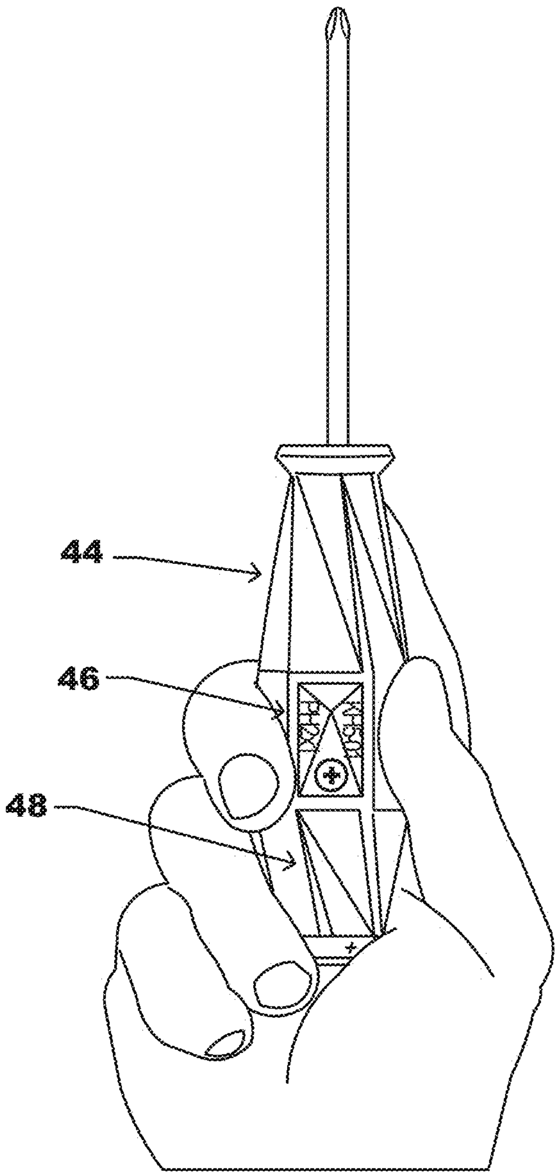

Referring now to FIGS. 7A to 7C, the handle body 14 provides ergonomic advantages for at least three different manual driver grips. The distal portion 44 and proximal portion 48 can serve as torque zones (achieved, respectively, by the wall geometry of the distal portion recesses 68A, 68B, 68C, 68D, 68E, 68F and the wall geometry of the proximal portion recesses 62A, 62B, 62C, 62D, 62E, 62F). These torque zones improve handle purchase and leverage during rotation of the manual driver handle, increasing torque transfer without compromising comfort. The middle portion 46 has the middle portion recesses 66A, 66B, 66C, 66D, 66E, 66F which can serve as anchor zones. The anchor zones provide additional purchase area for fingers that assist in stabilizing and driving the handle body 14 during rotation of the manual driver.

FIG. 7A shows a power grip in which both the thumb and index finger bear against torque zones in the distal portion 44, while the middle finger wraps about anchor zones in the middle portion 46. FIGS. 7B and 7C show two distinct precision grips. In FIG. 7B, the index finger engages in an anchor zone of the middle portion 46, while the thumb bears against a torque zone in the proximal portion 48. In FIG. 7C, both the thumb and middle finger bear against anchor zones in the middle portion 46, while the index finger engages a torque zone in the distal portion 44.

Figure 8:
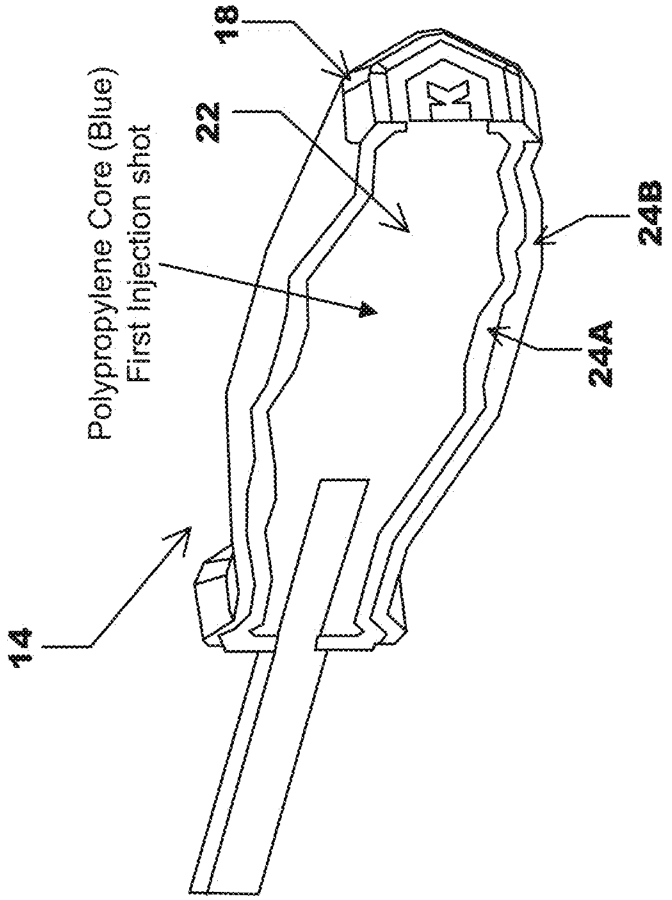
Figure 9:
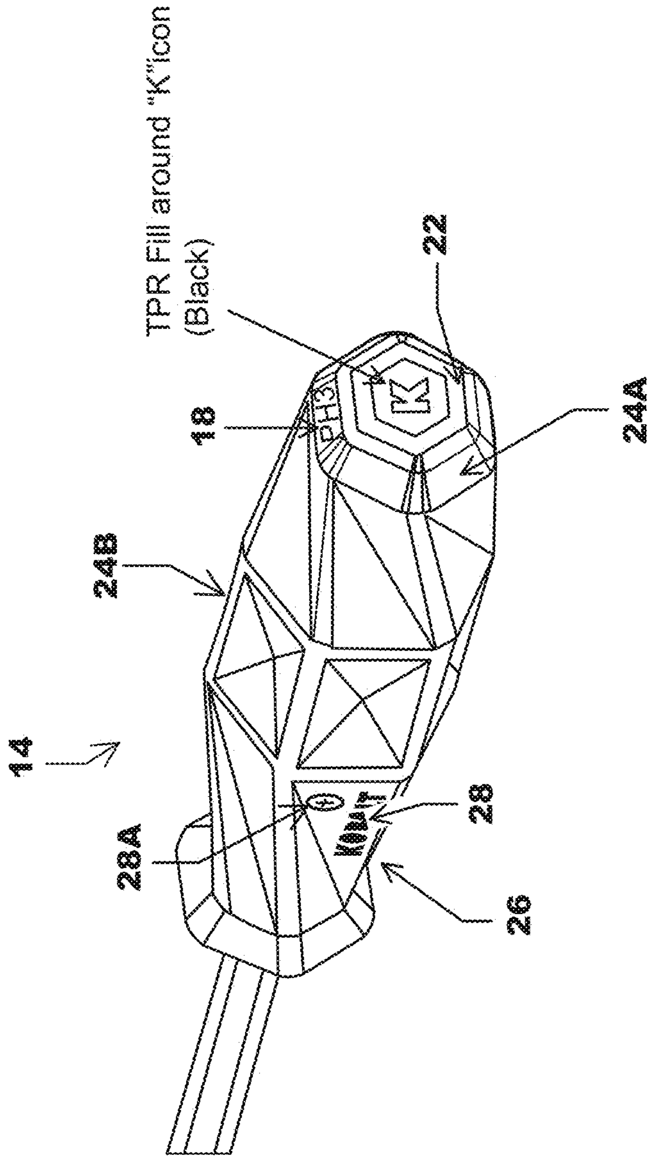
Figure 10:
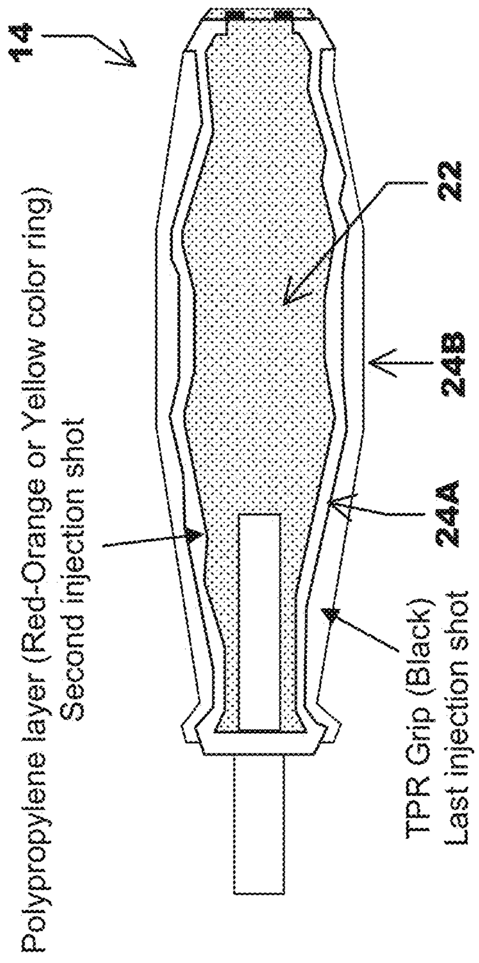
Figure 11:
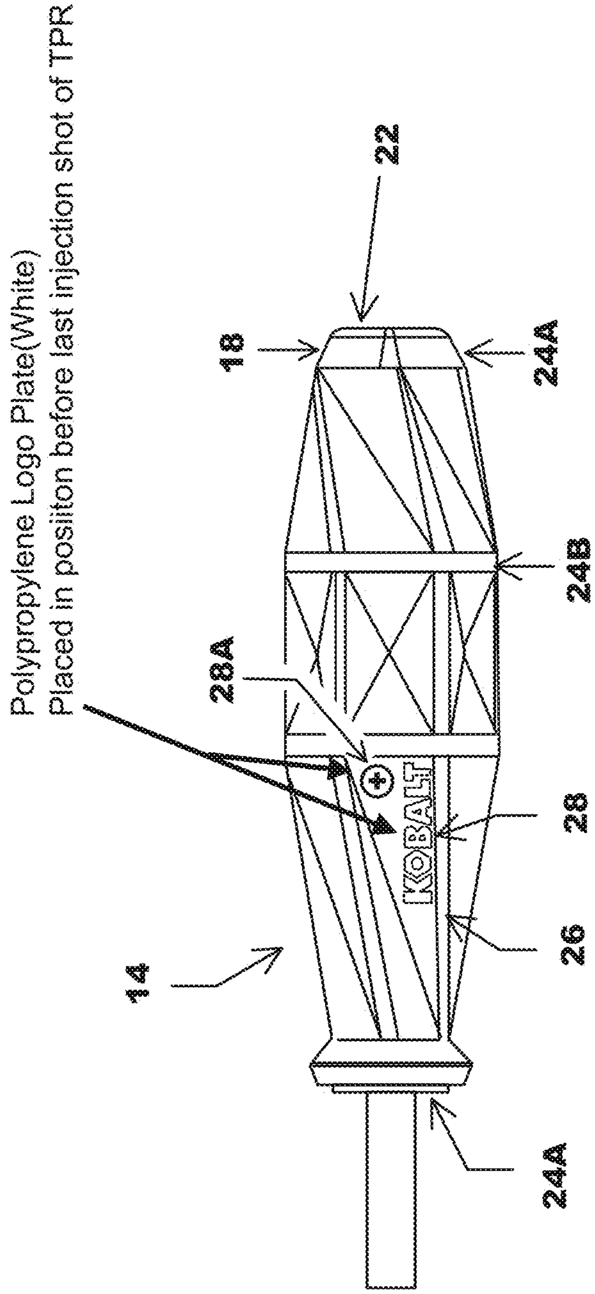

FIGS. 8-11 show another multi-layered example of the ergonomic handle 14. The handle 14 includes a core 22 made of a first material (e.g., polypropylene or other suitable core material) and at least one layer (e.g., layers 24A and/or 24B) of additional material surrounding the core 22. The one or more layers 24A and/or 24B can be made of the same material as the first material (e.g., polypropylene in the illustrated example of layer 24A) or a different material (e.g., thermoplastic rubber ("TPR") in the illustrated example of layer 24B or any other suitable exterior material for a manual driver grip). One of the layers (e.g., 24A) forms an information ring 18 that is visible on an outer surface of the handle 14 and that bears indicia (e.g., "PH3") indicative of a configuration of the tip 16. For example, in the illustrated embodiment, the information ring 18 includes the marking "PH3", which designates a size 3 Phillips screwdriver, and a "+" icon (e.g., as shown at the bottom of FIGS. 8 and 9) which denotes a cross-sectional shape of the tip 16 (e.g., of a Phillips screwdriver). The handle 14 can also be configured to include an ICON insert 26 which protrudes through one or more of the layers 24A and 24B and is configured to display a company or brand LOGO 28 and/or another indicator 28A of the tip's 16 cross-sectional shape (e.g., "+" of a Phillips screwdriver). The ICON insert 26 can be configured as a plate (e.g., a polypropylene plate of a color, such as white, that contrasts with the color of layer 24B) and can include raised indicia (e.g., "KOBALT" and "+") that project out from a surface of the plate. The plate can be attached to the layer 24A before layer 24B is over-molded onto layer 24A. The indicia's rise from the surface of the plate can be selected so that the indicia engage an inner surface of the mold when layer 24B is over-molded onto layer 24A. As a result, the indicia can be made to extend through the layer 24B and be visible on an outer surface of the handle 14. To provide another logo (e.g., "K") at the proximal end of the handle 14, the mold that is used when making the core 22 can include projections that create the logo during molding of the core 22. To improve visibility of the logo, a contrasting material can be molded into the recess surrounding the logo (e.g., using a black material, such as the TPR that is utilized when over-molding layer 24B onto layer 24A).

Although the foregoing manual driver example is shown as having substantially planar facets and the facets are shown as intersecting along a substantially straight line, alternative configurations of the handle can include curvature or otherwise non-linear transitions from one facet to another. The facets also can be configured to be non-planar or only partially planar (e.g., including some curvature). Such facet configurations in the torque zones can be configured advantageously, as shown or otherwise, so that manual rotation of the handle via a torque zone naturally and comfortably induces a combination of axial compression and torsion in the elongated shank for transfer to a fastener or other object to be driven via the tip, which helps keep the tip engaged to the object being driven.

Although the forgoing examples of the manual driver are shown as having substantially straight and linear perimeter line segments and substantially straight intervening perimeter segments associated with the substantially hexagonal or otherwise polygonal cross-sections, alternative implementations of the manual driver can include polygonal perimeter line segments and intervening perimeter segments that are not strictly linear or straight (e.g., these segments can include curves, or texturing) and instead are configured to approximate the hexagon or polygon by providing distinct sides about the circumference of the handle which approximate or resemble the general shape of a polygon (e.g., a hexagon). In this regard, the term "polygonal perimeter line segment" and "intervening perimeter segment" encompass segments that are combined to define a shape that resembles a polygon despite not having perfectly straight and linear sides (e.g., having a textured side or having a slight curvature or variation from straight).

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims. For example, while the illustrated embodiment of the handle portion 16 has a hexagonal configuration, the handle portion 16 can have any suitable polygonal configuration.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the middle portion comprises circumferentially distributed middle portion pyramid-shaped recesses, wherein the handle has a handle length from the proximal end to the distal end, and wherein each of the middle portion pyramid-shaped recesses extends between 17 to 27 percent of the handle length.

2. The manual driver of claim 1, wherein the middle portion pyramid-shaped recesses comprise six of the middle portion pyramid-shaped recesses.

3. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the distal portion comprises circumferentially-distributed distal portion faceted recesses, wherein each of the distal portion faceted recesses is defined by a distal portion first triangular facet and a distal portion second triangular facet, wherein each distal portion first triangular facet extends from a proximal end of the distal portion to a distal end of the distal portion, and wherein each distal portion second triangular facet extends from the proximal end of the distal portion to the distal end of the distal portion.

4. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the distal portion comprises circumferentially-distributed distal portion faceted recesses, and wherein the distal portion faceted recesses comprise six of the distal portion faceted recesses.

5. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the distal portion comprises circumferentially-distributed distal portion faceted recesses, wherein the handle has a handle length from the proximal end to the distal end, and wherein each of the distal portion faceted recesses extends between 37 to 47 percent of the handle length.

6. The manual driver of claim 3, wherein a cross-section area of the handle through the distal end of the distal portion is less than a cross-sectional area of the handle through the proximal end of the distal portion.

7. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the proximal portion comprises circumferentially-distributed proximal portion faceted recesses, wherein each of the proximal portion faceted recesses is defined by a proximal portion first triangular facet and a proximal portion second triangular facet, wherein each proximal portion first triangular facet extends from a proximal end of the proximal portion to a distal end of the proximal portion, and wherein each proximal portion second triangular facet extends from the proximal end of the proximal portion to the distal end of the proximal portion.

8. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the proximal portion comprises circumferentially-distributed proximal portion faceted recesses, and wherein the proximal portion faceted recesses comprise six of the proximal portion faceted recesses.

9. A manual driver comprising:

an elongated shank extending along a shank axis; and a handle comprising a handle body attached to the elongated shank, wherein the handle body comprises a proximal end, a distal end, a proximal portion, a middle portion, and a distal portion; wherein the middle portion is disposed between the proximal portion and the distal portion, wherein the distal portion is disposed between the distal end and the middle portion, wherein the proximal portion is disposed between the middle portion and the proximal end, wherein the proximal portion comprises circumferentially-distributed proximal portion faceted recesses, wherein the handle has a handle length from the proximal end to the distal end, and wherein each of the proximal portion faceted recesses extends between 19 to 29 percent of the handle length.

10. The manual driver of claim 9, wherein a cross-section area of the handle through the proximal end of the proximal portion is less than a cross-sectional area of the handle through the distal end of the proximal portion.

11. The manual driver of claim 1, wherein:

the handle further comprises an information ring and an end cap;

the end cap comprises an end cap elongated shaft and a flanged portion;

the information ring defines an information ring central aperture;

the handle body defines an end cap receptacle; and the end cap elongated shaft extends through the information ring central aperture and into the end cap receptacle.

12. The manual driver of claim 7, wherein:

the distal portion comprises circumferentially-distributed distal portion faceted recesses;

each of the distal portion faceted recesses is defined by a distal portion first triangular facet and a distal portion second triangular facet;

each distal portion first triangular facet extends from a proximal end of the distal portion to a distal end of the distal portion; and each distal portion second triangular facet extends from the proximal end of the distal portion to the distal end of the distal portion.

13. The manual driver of claim 12, wherein:

the handle has a handle length from the proximal end to the distal end; and each of the distal portion faceted recesses extends between 37 to 47 percent of the handle length.

14. The manual driver of claim 3, wherein:

the proximal portion comprises circumferentially-distributed proximal portion faceted recesses;

each of the proximal portion faceted recesses is defined by a proximal portion first triangular facet and a proximal portion second triangular facet;

each proximal portion first triangular facet extends from a proximal end of the proximal portion to a distal end of the proximal portion; and each proximal portion second triangular facet extends from the proximal end of the proximal portion to the distal end of the proximal portion.

15. The manual driver of claim 14, wherein:

the handle has a handle length from the proximal end to the distal end; and each of the proximal portion faceted recesses extends between 19 to 29 percent of the handle length.

* * * * *